United States Patent [19]

Holzhauser et al.

[11] 4,176,945

[45] Dec. 4, 1979

[54] SHEET FEEDING APPARATUS FOR USE WITH COPIER/DUPLICATORS OR THE LIKE

[75] Inventors: Ronald C. Holzhauser, Holley, N.Y.; Carl H. Zirngibl, DeBary, Fla.; Vincent J. O'Brien, Rochester, N.Y.

[73] Assignee: Eastman Kodak Company, Rochester, N.Y.

[21] Appl. No.: 923,874

[22] Filed: Jul. 12, 1978

[51] Int. Cl.² ............... G03B 27/32; G03B 27/52
[52] U.S. Cl. ............... 355/23; 271/65; 271/186; 355/3 SH; 355/14
[58] Field of Search ............... 355/3 SH, 14, 23, 24, 355/50, 51; 271/3.1, 65, 186

[56] References Cited

U.S. PATENT DOCUMENTS

| | | | |
|---|---|---|---|
| 3,833,911 | 9/1974 | Caldwell et al. | 355/24 X |
| 4,014,609 | 3/1977 | Ver Schage et al. | 355/23 X |
| 4,110,025 | 8/1978 | Tabata | 355/24 X |
| 4,140,387 | 2/1979 | Gustafson | 355/23 X |

Primary Examiner—Richard A. Wintercorn
Attorney, Agent, or Firm—G. Herman Childress

[57] ABSTRACT

Document sheets are fed to a platen of a copier from two feeding apparatus, one of which is a recirculating feeder adapted to sequentially feed a plurality of document sheets of one document to the platen for copying information on one or both sides of each sheet. The sheets are circulated in a manner that results in the production of collated sets of copies. The platen also can receive one or more sheets of another document fed from a document positioner. The positioner can be used to feed a document that is too large to be accommodated by the recirculating feeder, or it can feed a document that may not be reliably handled by the recirculating feeder (such as a document made by assembling pieces of copy onto a backing sheet), or the positioner can feed documents comprising a single sheet. Also, the positioner can be used for making document masters that are then copied using the recirculating feeder.

11 Claims, 9 Drawing Figures

SHEET FEEDING APPARATUS FOR USE WITH COPIER/DUPLICATORS OR THE LIKE

CROSS REFERENCE TO RELATED APPLICATIONS

Reference is made to commonly assigned, copending U.S. Pat. Application Ser. No. 647,683, filed Jan. 8, 1976, which is a continuation of Application Ser. No. 523,610, filed on Nov. 13, 1974 in the name of M. J. Russel and entitled RECIRCULATING SHEET FEEDER; U.S. Pat. Application Ser. No. 786,666, filed Feb. 14, 1977 in the name of A. B. DiFrancesco et al and entitled APPARATUS FOR PRODUCING COLLATED COPIES IN PAGE SEQUENTIAL ORDER: U.S. Pat. Application Ser. No. 768,665, filed Feb. 14, 1977 in the name of A. B. DiFrancesco et al and entitled METHOD AND APPARATUS FOR PRODUCING DUPLEX COPIES, now U.S. Pat. No. 4,095,979, issued June 20, 1978: and to U.S. Pat. Application Ser. No. 924,106, entitled APPARATUS FOR SELECTIVELY COPYING DOCUMENTS FROM TWO DIFFERENT FEEDERS filed on even date herewith in the name of C. T. Hage.

BACKGROUND OF THE INVENTION

1. Field of the Invention

This invention relates to reproduction apparatus in general and, more specifically, the invention relates to improved document sheet feeding apparatus for presenting multiple sheet simplex or duplex documents to a copier/duplicator to make collated sets of copies of such documents and for presenting an individual document sheet to the copier along another path to make individual or multiple copies of the individual document sheets.

2. Description of the Prior Art

Copier/duplicators typically comprise a platen against which an original document is positioned for copying by exposing the document while on the platen and projecting an image of the document onto a photoconductor where the image is developed. The image then is transferred to a copy sheet and fused to the copy sheet. Document positioners are known for feeding individual document sheets to a platen for copying and then for feeding the sheets to a storage area. A typical feeder of this type is disclosed in U.S. Pat. No. 3,844,552 which issued on Oct. 29, 1974 in the names of Bleau et al. It is also known to provide recirculating document feeders which respectively feed individual sheets of a multi-sheet document from a stack to the platen and then away from the platen so that the copier produces collated sets of copies without collating apparatus. Examples of such document feeders are disclosed in the related copending U.S. Pat. Applications referenced above and in U.S. Pat. No. 27,976.

Recirculating document feeders as disclosed in such copending applications provide significant improvements in the copying operation, especially in regard to the convenience to the user and the ability to make collated sets of copies without the need for a collator. However, when a user wishes to make copies of an original document too large for the feeder, or when the original document is prepared by pasting or otherwise assembling various portions of the document onto a backing sheet, the original may not feed reliably through the recirculating feeder. Also, some documents to be copied comprise one or only a few pages, and one or only a few copies of each page is required. In some cases the recirculating feeder can be stopped and then swung away from the platen to manually place directly onto the platen the page or pages of the document that are to be copied, and then one or more copies of the original can be made in the usual manner. One or more "master" copies can be made in this manner from documents not suitable for use in the recirculating feeder, and the "master" copies thus produced can be placed in the recirculating feeder in order to produce collated sets of copies. However, it is somewhat inconvenient to the machine operator to move the recirculating feeder away from the platen each time copies or "masters" are to be made in this manner, and the time required in converting from one mode of operation to another reduces the potential usage level of the copier. Clearly, it would be advantageous to be able to make copies from oversize originals, paste-up documents or from other documents without having to manually interrupt the job being run on the recirculating feeder, swing the feeder away from the platen, make the required number of copies of the oversize or paste-up originals, and then reposition and restart the recirculating feeder.

U.S. Pat. No. 4,062,533 to Greenberg, et al relates to a photocopy machine having a document feed module that jointly defines a straight line feed path leading to an exposure position. Document sheets can be fed to the feed path either manually or automatically, and the feed module can be swung away from the machine for copying of books and similar documents. However, there is no provision for automatic recirculation of document sheets.

SUMMARY OF THE INVENTION

The present invention relates to sheet feeding apparatus comprising a combination recirculating sheet feeder and document positioner. The apparatus is used with a copying machine having an exposure station at which document sheets are positioned for copying of information on one or both sides of the sheets. The apparatus has means for supporting at least one document sheet at a location spaced from the platen. Means are provided for defining a recirculating sheet path extending from said supporting means to the platen and back to said supporting means. Means defining a non-recirculating sheet path extends to the platen and away from the platen. The two sheets paths are at least partially coextensive in the area of the platen. Drive means are provided for advancing document sheets along said sheet paths.

The present invention also relates to a sheet feeder for copying information on both sides of a document sheet wherein a document sheet is removed from the support means, driven across the platen, around a sheet inverting path and back onto the platen for registration and copying of one side of the document sheet. Then the sheet is driven through the inverting path and back onto the platen again for registration and copying of information on the second side. After the second side is copied, the sheet is returned to the supporting means along a sheet inverting path.

The invention and its advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENT

Figure 1:
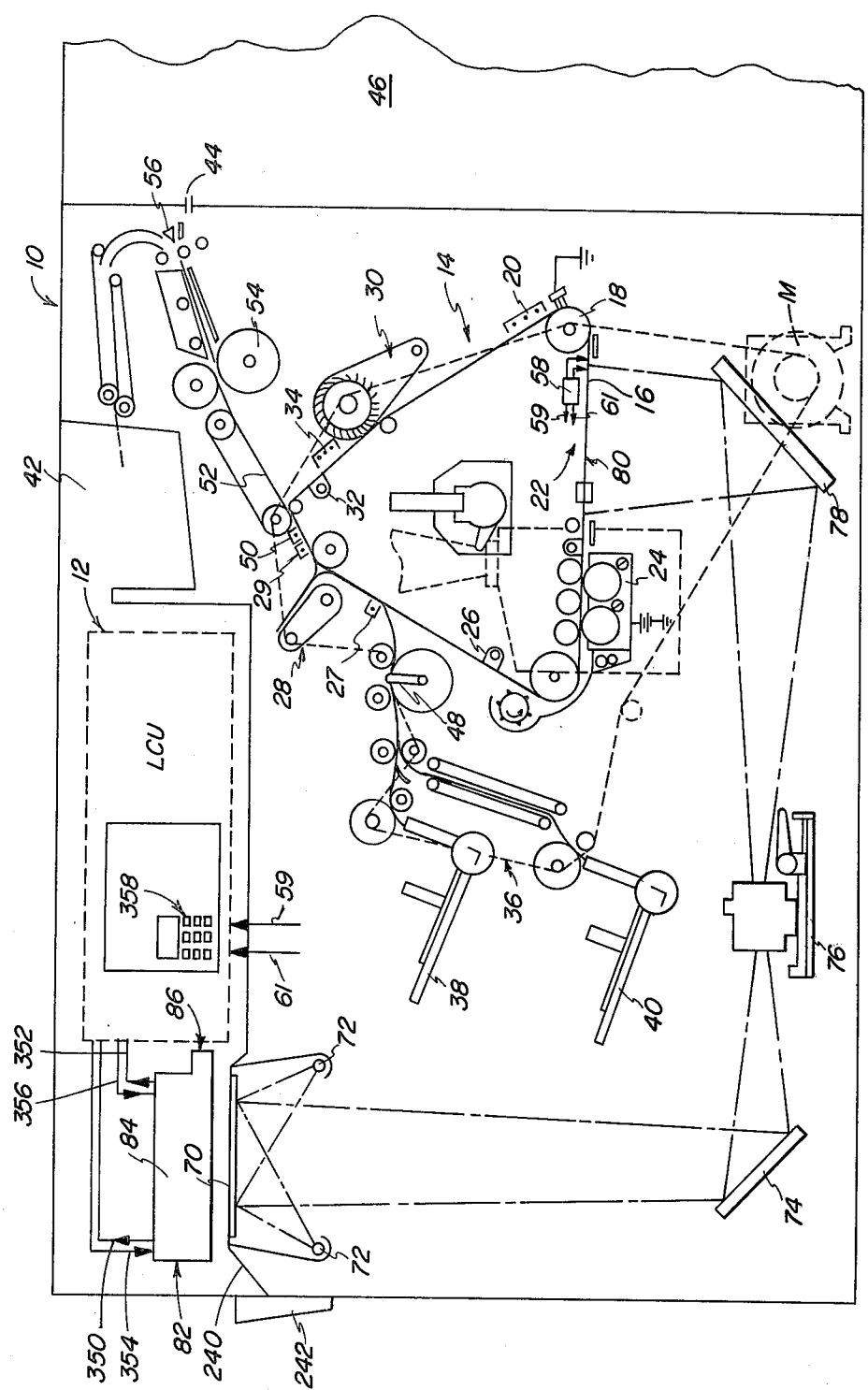
FIG. 1 is a schematic representation of a copier and a preferred embodiment of the apparatus of this invention.

Referring now to the drawings, a copier/duplicator with sheet feeding apparatus of the present invention is illustrated generally at 10 in FIG. 1. The copier includes a logic and circuit unit (LCU) 12 which monitors and controls various elements of the copier. A copier process section 14 has a photoconductor 16 trained to run in a closed-loop path about a plurality of web-constraining rollers. One of these rollers 18 is coupled to a drive motor M so that the photoconductor is driven in a clockwise direction in its closed loop path when the motor is connected to an appropriate source of potential. This movement of the photoconductor causes successive image frames on the photoconductor sequentially to pass adjacent a series of electrophotographic work stations which, for the purpose of this disclosure, can be described as follows:

a charging station 20 at which the photoconductor is sensitized by receiving a uniform electrostatic charge;

an exposing station 22 at which the photoconductor receives a latent electrostatic image by projecting a light pattern representing the document sheet onto the sensitized photoconductor;

a developing station 24 at which the latent electrostatic image is rendered visible by the application of toner;

a post development erase station 26 at which the photoconductor is illuminated to remove the residual charge on the photoconductor;

a first image transfer station 27 at which the developed and visible image is electrostatically transferred from the photoconductor to one side of a copy sheet;

a copy sheet inverter station 28 which lifts the copy sheet from the photoconductor and then returns it to the photoconductor in a manner which inverts the sheet (e.g., as disclosed in the before-mentioned copending U.S. Pat. No. 4,095,979;

a second image transfer station 29 at which a second developed and visible image is electrostatically transferred from the photoconductor to the second side of the copy sheet; and a cleaning station 30, including erase and discharging devices 32 and 34, respectively, at which the photoconductor is cleaned of any residual marking particles and electrostatic charge.

A copy handling mechanism 36 moves copy sheets, or other suitable supports, in a path from either of two supply hoppers 38 and 40, through the transfer stations 27 and 29, and on to either a delivery hopper 42, where the copies are deposited for retrieval by the operator, or an exit 44, where the copies can be delivered to a finisher 46 for suitable finishing operations, such as jogging, stapling and stacking. Additional stations located along this path of movement include the following:

a registration device 48 for establishing proper alignment between the copy sheets in the copy handling mechanism and the image frame of the photoconductor;

a discharging device 50 for reducing electrostatic attraction between the copy sheets and the photoconductor in order to facilitate separation of the copy sheets from the photoconductor;

a suitable transport 52 for the unfused copy sheets;

a fusing device 54 for permanently fixing the toner to the copy sheets by the application of heat and pressure; and a sheet diverter 56 for directing the copy sheets to either the delivery hopper 42 or exit 44.

The logic and control unit 12 coordinates operation of the various copier stations with movement of the copy sheets and the latent and visible images on the photoconductor. To facilitate this coordination, the photoconductor preferably is provided with a plurality of perforations, not shown, adjacent one of its edges. Means 58 adjacent the photoconductor sense the perforations. Signals from the sensing means are furnished to the logic and control unit 12 by leads 59 and 61. Additional sensors are provided in the copy path. In this manner input signals can be generated to which the LCU can respond for sequentially operating the work stations as well as for controlling the operation of many other machine functions. Similarly, output data and control signals from the LCU are applied to the work stations. The output signals from the LCU 12 are logic level digital signals which are buffered and amplified to provide drive signals to various clutches, brakes, solenoids, power switches, and numeric displays in various portions of the apparatus described herein. A more complete description of suitable means for coordinating operations in a copier is disclosed in U.S. Pat. No. 3,914,047, entitled SYNCHRONIZING CONTROL APPARATUS FOR ELECTROPHOTOGRAPHIC APPARATUS UTILIZING DIGITAL COMPUTER and issued in the names of William E. Hunt, Jr. et al on Oct. 21, 1975. Reference also is made to the before-mentioned copending U.S. Patent Application Ser. No. 924,106 entitled APPARATUS FOR SELECTIVELY COPYING DOCUMENTS FROM TWO DIFFERENT FEEDERS, filed on even date herewith, which discloses apparatus for coordinating operation of a copier having a recirculating feeder and a document positioner.

The copier has a platen 70 against which documents are positioned for copying. A document on platen 70 is illuminated by flash lamps 72. An image of the document is reflected by a mirror 74 to a lens 76, projected by the lens onto a second mirror 78, and reflected to an image plane 80 formed along a flat portion of the photoconductor 16 in the area of the exposing station 22.

In accordance with the present invention document sheets are fed to the platen 70 by sheet feeding apparatus 82 comprising a combination recirculating document feeder 84 and document positioner 86. The recirculating feeder typically is used for making completely finished sets of copies of the document by recirculating each document sheet to the platen for copying in a sequence that results in collated copies being made by the copier. The document positioner normally is used for making a single copy, or only a few copies, of documents comprising a single document sheet, or only a few document sheets that are fed to the platen only once for making the required number of copies.

The recirculating feeder includes a hopper 90 that is located above and spaced from the platen 70 in a location where it is readily accessible for receiving and supporting a set of original document sheets, each of which is designated S. The sheets are placed face up in their normal page-sequential order for delivery, one after another, last sheet first, from the bottom of the set to the platen 70 for copying, and thereafter are returned to the hopper on top of any other document sheets in the hopper. The hopper comprises a tray 92 having a bottom 94 and a pair of side sheet guides 96 that serve to keep the document sheets aligned one on top of the other. The tray slopes downwardly toward a forward wall 98 so that gravity assists in aligning the document sheets against the forward wall of the tray. Adjacent the end of the tray opposite from the wall 98 there is a set-completed detector 100 that determines, without counting, each time the entire set of original document sheets S has been copied. Further details of the hopper construction and of the set detector are set forth in the previously mentioned copending U.S. Pat. Application Ser. No. 647,683.

Apparatus is provided for separating the lowermost sheet from the stack and feeding it to the platen for copying. More specifically, this apparatus comprises an oscillating vacuum pick-off device 102 which pulls the lowermost sheet down onto the device and then feeds it downwardly and to the right as viewed in FIG. 2 and into a driving nip formed by two rings 104 and drive rollers 106. The rings are recessed in the oscillating vacuum device and are rotatable independently of the device 102. Rollers 106 are mounted on a shaft 108 that is driven in a counterclockwise direction in a manner described later in connection with FIG. 5. Document sheets fed through the nip are delivered into a guide path 110 defined by space, gently curved guide members 112 and 114 which are shaped so that the lower end of the guide path delivers the sheets into an exposure station between the upper surface of the platen 70 and the lower surface of a base plate 116 of the feeder. Thus document sheets withdrawn from the hopper 90 are inverted as they pass around the oscillating vacuum device and fed onto the platen 70.

Figure 2:
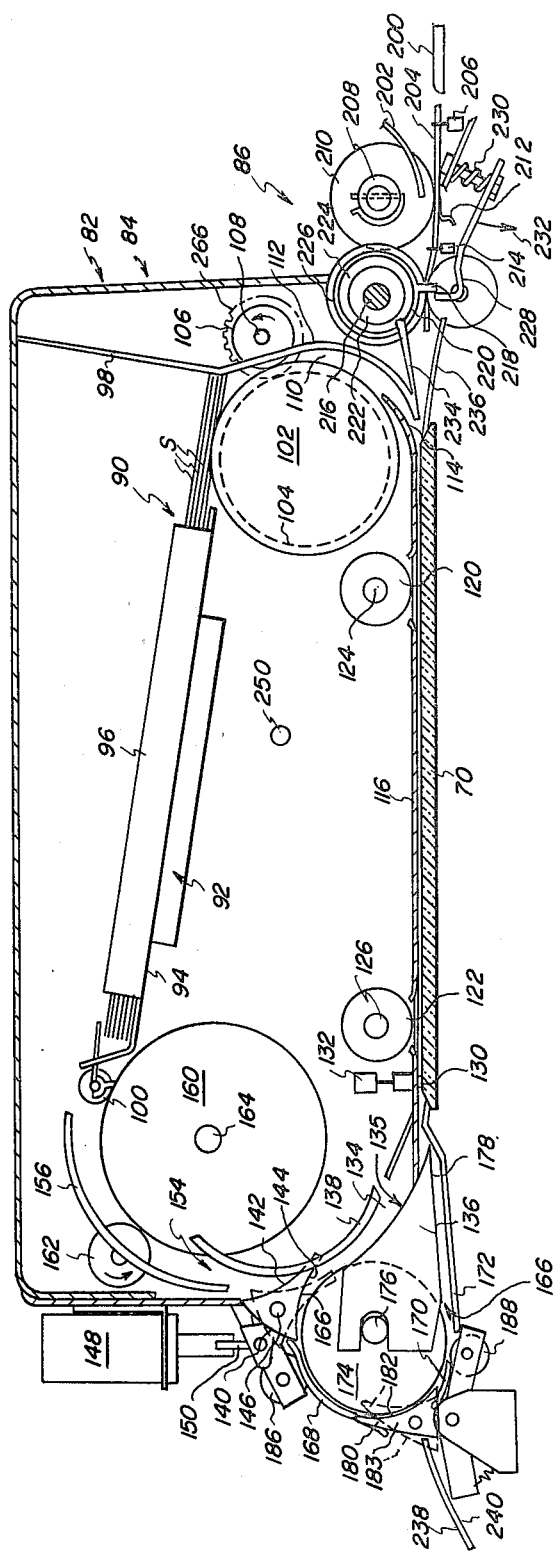
FIG. 2 is a cross section through the sheet feeding apparatus shown in FIG. 1.

When the document sheets reach the platen 70 they are engaged and driven across the surface of the platen by a plurality of feed rollers, two of which are shown at 120 and 122 in FIG. 2. These rollers are supported on shafts 124 and 126, respectively that extend across the recirculating feeder and support and drive additional drive rollers. When information on only the upper side of each document sheet S is to be copied, i.e., when simplex originals are to be copied, then a gate 130 is positioned across the path of the document sheets so that the sheets are driven against the gate to stop the sheet on the platen in a position for copying. After lamps 72 are flashed to expose the document for copying of the document sheet, the gate 130 is lifted by suitable means, such as a solenoid 132. During the entire time the document sheet is on the platen rollers 120 and 122 continue to rotate and urge the sheet against gate 130, thereby correcting any skew that may be present in the document sheet.

Figure 3:
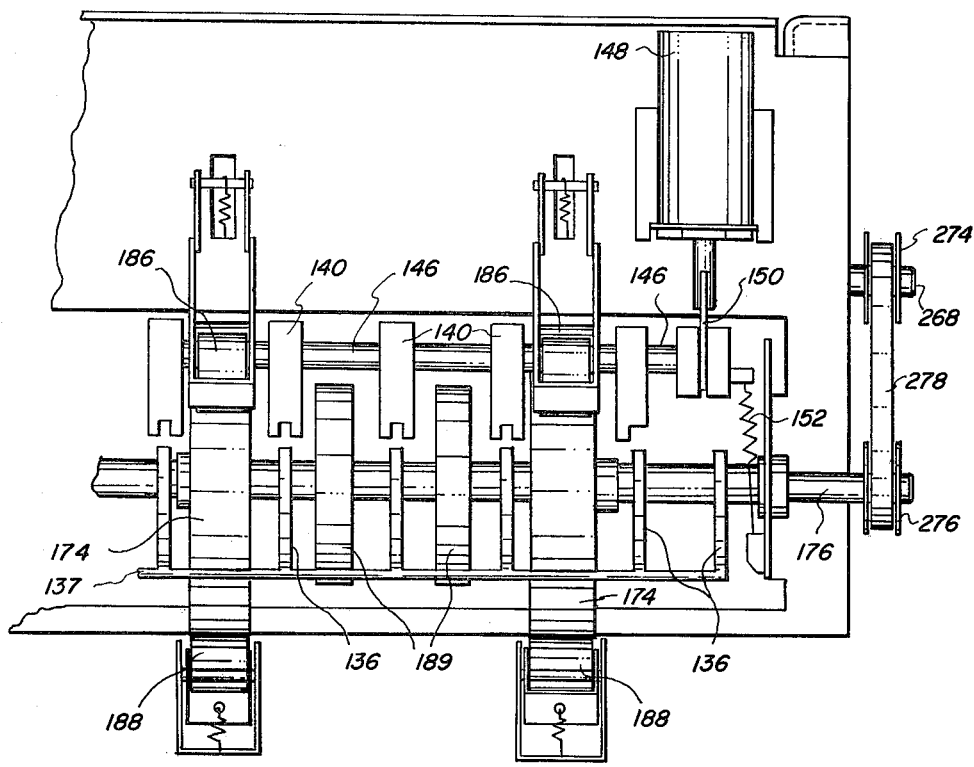
FIG. 3 is a fragmentary view of the left end of the apparatus shown in FIG. 2.
Figure 4:
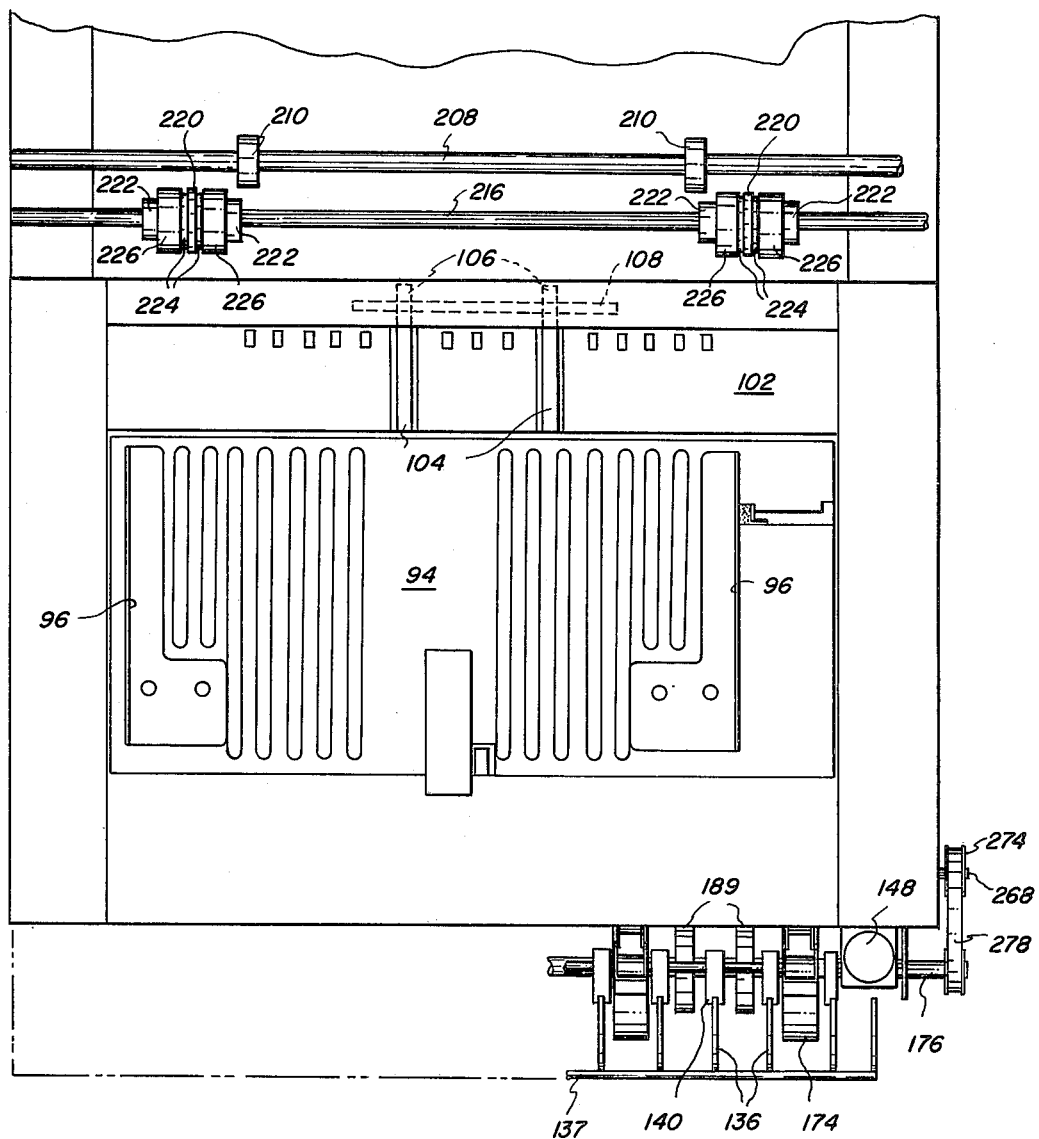
FIG. 4 is a plan view of the sheet feeding apparatus.

As soon as the gate 130 is lifted, the document sheet is driven from the platen by the rollers 120 and 122 and into a guide path 134 defined by a surface 135 on a plurality of sheet deflectors 136 and a wire guide member 138. The deflectors are connected together by a rod 137 (FIGS. 3 and 4). The document sheet is thus delivered to a plurality of sheet diverters 140 having sheet deflecting surfaces 142 and 144. The diverters are mounted on a shaft 146 for movement between each of two positions illustrated in solid and dotted lines in FIG. 2. A solenoid 148 (FIGS. 3 and 5) is coupled to the shaft by means of a linkage 150 so that when the solenoid is energized the diverters are simultaneously moved to the position shown in dotted lines in FIG. 2. When the solenoid is de-energized a spring 152 pivots the shaft 146 and thus the diverters to the solid line position shown in FIG. 2.

When the recirculating feeder is circulating simplex document sheets S, the diverters are positioned in their dotted line position so that the guide surface 142 of each diverter deflects the document sheet upwardly into a sheet-inverting guide path 154 located between the guide 138 and a guide 156. The document sheet enters the nip between drive rollers 160 and idler rollers 162 which jointly drive the document sheet through path 154 and back into the tray 92 on top of other document sheets S in the tray. Drive rollers 160 are mounted on a shaft 164 that is rotated in a manner described hereinafter in connection with FIG. 5.

When the document sheets S contain information on both sides thereof that is to be copied by means of a duplex copying operation, the sheet diverters 140 are positioned as shown in the solid lines in FIG. 2 so that a document sheet passing through the guide path 134 engages the surfaces 144 of the diverters 140 and is deflected into an inverting sheet path designated 166. This inverting sheet path is defined by wire guides 168, 170 and 172, a plurality of rollers 174 that are mounted for rotation on a shaft 176, and the lower edge surface 178 of each sheet deflector 136. Located along the guide path 166 is a sheet diverter 180 which is positioned in its solid line position when duplex copies are to be made and which has a surface 182 that defines part of the inverting guide path 166. The document sheet is driven through the guide path 166 by the rollers 174, which are driven in a counterclockwise direction as viewed in FIG. 2, and by suitable pressure rollers shown at 186 and 188. Mounted on shaft 176 and located between adjacent drive rollers 174 are a plurality of rollers 189 (FIG. 3) which support a sheet in path 166.

For duplex copying, a sheet S is transported across the platen from right to left and fed into guide 134. It is deflected by surface 144 on diverter 140 into the inverting path 166, and then is driven by rollers 174 and pressure rollers 186 and 188 through the inverting path 166 and guided back onto the platen by the guides 172 and the surface 178 of the sheet deflector 136. By the time the document sheet returns to the platen, the rollers 120 and 122 are being driven in the reverse direction so that the document sheet is propelled back across the platen 70 in a second direction (to the right) opposite to the direction of its original travel across the platen. After the trailing edge of the document sheet has cleared the registration gate 130, the gate is lowered and rollers 120, 122 are reversed again to bring the sheet into registration against the gate 130. This manipulation of the document sheet brings the side of the document sheet that faces downwardly in the tray into a position facing the platen and in registration for copying. After the lamps 72 have been flashed to expose the document sheet, the gate 130 is raised and the document sheet again is driven through the inverting sheet path 166 and back onto the platen in the manner previously explained for registration against the gate a second time so that the side of the sheet facing upwardly in the tray 92 is then facing the platen and available for exposure. After lamps 72 are flashed a second time to expose the second side of the document sheet, the document sheet is again driven from the platen into guide path 134. At this time, the sheet diverter 140 is located in its dotted line position so that the document sheet is deflected by the surface 142 upwardly into the guide path 154 for return to the top of the stack of document sheets in the tray as explained hereinbefore.

Each time the lamps 72 are flashed an image is projected onto the photoconductor at the exposing station 22. The resultant latent image is developed at station 24 and transferred onto one side of a copy sheet of paper at the transfer station 27. When duplex copies are to be made, the copy sheet is inverted in station 28 and a second image is transferred to the second side of the copy sheet at station 29. When only simplex copies are to be made the sheet is not inverted and the second image is not transferred at station 29. In either event the copy sheet is fed by transport 52 to the fusing device 54 where the image is permanently fixed onto the copy sheet. Then the copy sheet is delivered either to the finisher 46 or to the hopper 42. Whether simplex copies are made from simplex originals, or when duplex copies are made from duplex originals, the image on the upper surface of the copy sheet in hopper 42 corresponds to the image on the upper side of the original document sheet when it is in hopper 90. Thus by recirculating the document sheets the copy sheets are stacked in the same order and sequence as the original document sheets S. In this manner collated sets of copies are produced without the need for a collator. Collated sets of copies also are produced when simplex copies are made from duplex originals and when duplex copies are made from simplex originals.

At times it is desireable to be able to make one or more copies of a document sheet and then to remove the document sheet from the copier along a non-recirculating path. As explained previously, this may be done when only a few copies of a document sheet are to be made or when copies are to be made from document sheets that are not easily handled by a recirculating feeder structure as previously described. For document sheets of this type the document positioner 86 is provided. Positioner 86 comprises a tray 200 on which document sheets are positioned with the information to be copied facing downwardly. Initially a sheet is manually fed toward platen 70 through a pair of spaced sheet guides 202 and 204. As the document sheet is moved from the tray between the paper guides it trips a switch 206 which closes a circuit to start rotation of a drive shaft 208 and a plurality of drive rollers 210 mounted on the shaft. Continued manual advancement of the sheet results in its leading edge being fed into a nip between the rollers 210 and associated spring biased pressure members or plates 212, which hold the sheet against the rollers so that the sheet is advanced by the rollers 210.

When the leading edge of the sheet leaves the nip of rollers 210 and plates 212, it trips a switch 214 to begin rotation of a drive shaft 216 in a clockwise direction. The sheet is then brought into engagement with a plurality of registration gate pins 218 that project from gate rollers 220. The gate rollers are positioned around a hub 222. Hub 222 is secured to shaft 216 for simultaneous rotation therewith. Each gate roller is abutted at its end faces by a pair of thrust washers 224. Drive rollers 226 on opposite sides of the thrust washers are secured to the hub 222 in a position to urge the thrust washers against the registration rollers so that there is a tendency for the registration rollers to rotate with the hub. However, each registration roller normally is latched against rotation with the hub by a registration gate detent pawl 228 which is urged by a spring 230 into the position illustrated in FIG. 2 where it is engaged by the gate pin 218 to hold the pin and roller against rotation. At the appropriate time in the machine cycle the pawl momentarily is moved downwardly out of its latching position by means shown diagrammatically at 232 which applies a release force in the direction illustrated, thereby permitting the registration rollers and pin to be rotated with the hub to release a document sheet and allow it to be driven from the gate. As the gate pins are moved, the sheet enters the nip between the drive rollers 226 and sheet guide 204 so that the sheet then is driven by both the drive rollers 226 and rollers 210. Reference is made to commonly assigned U.S. Pat. Nos. 4,019,732 and 4,019,733, issued Apr. 26, 1977 for a similar sheet registration mechanism.

As a document sheet leaves the gate it is directed by guides 234 and 236 into the lower end of the guide path 110 and into the exposure station between the platen 70 and the feeder base plate 116. Pins 218 continue to rotate until they rest on the upper surface of the document sheet. After the trailing edge of the sheet passes through the gate the pins return to the illustrated position in engagement with pawl 228, which previously had returned to its latching position.

The document sheet thus delivered onto the platen is advanced by the rollers 120 and 122 into engagement with the registration gate 130 where it is held until exposed by lamps 72 the required number of times. Then the gate is elevated and the document sheet is driven into the guide path 134 by the platen rollers 120 and 122. As this time the sheet diverter 140 is located in the position shown in solid lines in FIG. 2 and the sheet diverter 180 is tilted to the position shown in dotted lines. The document sheet engages diverter surface 144 and is deflected into the upper portion of the guide path 166 between the guide 168 and the drive roller 174 and pressure roller 186. Then the sheet engages the surface 183 of diverter 180 and is deflected out of the guide path 166 and along a path designated 238 which lies along the upper surface of a guide 240 leading to a tray 242 (FIG. 1). As soon as the first document sheet is moved away from the platen by rollers 120 and 122, the pawl 228 can be moved downwardly to again release the registration gate pins 218 to permit the next document sheet to be advanced onto the platen for copying one or more times. Thus sheets fed to the exposure platen from the document positioner travel along a substantially straight, non-recirculating sheet path that is co-extensive with the recirculating sheet path in the area of the exposure station and adjacent the ends thereof. The non-recirculating sheet path also has entrance and exit portions at each end thereof which intersect and diverge from the recirculating path.

Figure 5:
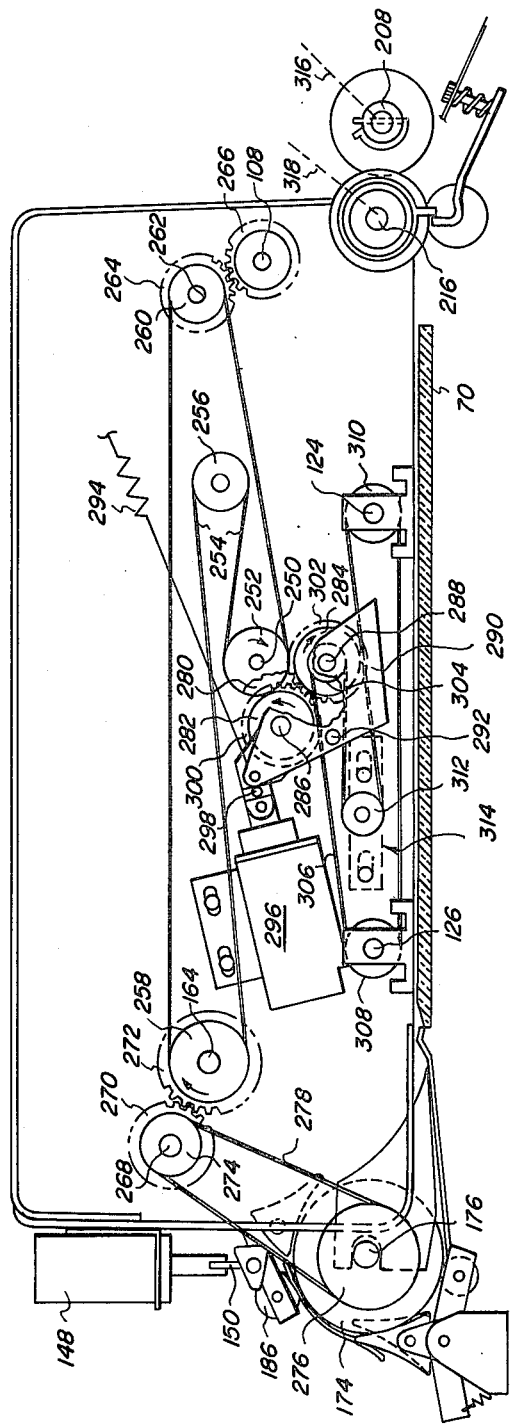
FIG. 5 illustrates a drive mechanism for parts of the sheet feeding apparatus.

Referring now to FIG. 5, the sheet feeding apparatus of the invention is powered from a main drive shaft 250 which is operatively coupled to a motor (not shown). Shaft 250 drives a belt pulley 252 mounted on the shaft in a clockwise direction. An endless belt 254 is trained around pulley 252, and around an idler pulley 256, a pulley 258 mounted on shaft 164, and a pulley 260 mounted on a shaft 262. As previously noted, the drive rollers 160 are mounted on the shaft 164 so that when the main shaft 250 is driven the rollers 160 are rotated to drive a document sheet through the guide path 154.

Gears 264 and 266 mounted on shafts 262 and 108, respectively, couple the drive from shaft 262 to the shaft 108, thereby rotating the drive rollers 106 in a counterclockwise direction for advancing a document sheet from the tray 92 through the guide path 110. Similarly, an intermediate shaft 268 is driven by means of a gear 270 mounted on that shaft which meshes with a gear 272 mounted on the shaft 164. A pair of pulleys 274 and 276 are mounted on shafts 268 and 176, respectively, and shaft 176 is driven by a belt 278 trained around these two pulleys. In this manner the drive rollers 174 are driven in a counterclockwise direction for advancing a document sheet through a guide path 166 either to invert the sheet or to drive it out of the apparatus along the non-recirculating path 238.

A friction drive roller 280 also is mounted on the main drive shaft 250 in spaced relation to the pulley 252. A pair of friction rollers 282 and 284 are aligned with the roller 280, and one or the other of the rollers 282, 284 can be brought into engagement with the roller 280 to effect rotation of the rollers 282 and 284. Rollers 282 and 284 are mounted on pins 286 and 288, respectively, which are supported on a bracket 290. Bracket 290 is moved about a pivot 292 by a spring 294, which urges the bracket in a clockwise direction, and by a solenoid 296 that is coupled to the bracket by a link 298 so that when the solenoid is energized the bracket tends to move in a counterclockwise direction. A set of gears 300 and 302 are mounted on shafts 286 and 288, respectively, so that rotation of either of the shafts in one direction causes simultaneous rotation of the other shaft in the opposite direction. Thus when the solenoid 296 is de-energized, the spring 294 brings the friction roller 282 into engagement with the drive roller 280 to thereby rotate the roller 282 in a counterclockwise direction. This motion is transmitted through the gear set 300, 302 to drive the shaft 288 and roller 284 in a clockwise direction. Similarly, when the solenoid 296 is energized, the bracket 290 tilts about pivot 292 to bring the friction roller 284 into engagement with roller 280, thereby to drive the roller 284 and shaft 288 in a counterclockwise direction. Thus solenoid 296 can be used to reverse the direction of the drive imparted to the shaft 288.

A pulley 304 is mounted on shaft 288. A drive belt 306 is trained around pulley 304, a pulley 308 mounted on the shaft 126, a pulley 310 mounted on shaft 124 and a pulley 312 which forms part of a belt tensioning apparatus designated 314. As noted before, shafts 124 and 126 drive the rollers 120 and 122 which advance document sheets across the platen 70. Thus the reversible drive provided by operation of solenoid 296 and acting through the friction pulleys 280, 282 and 284 can control the direction of rotation of the rollers 120 and 122 to drive document sheets in either of two directions across the platen.

The means for driving shafts 208 and 216 is shown diagrammatically at 316 and 318, respectively. This drive means can comprise a belt-pulley drive driven from shaft 250, or it can comprise a separate electrically operated drive mechanism.

Figure 6:
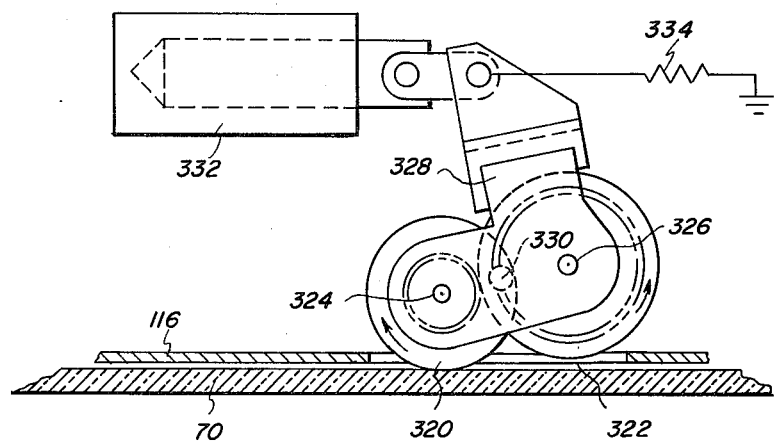
FIG. 6 shows a modification of the drive mechanism.

FIG. 6 illustrates another drive for reversing the direction of travel of a document sheet on the platen 70. In this embodiment, instead of reversing the direction the individual rollers are driven, two different sets of drive rollers 320 and 322 are provided in place of the rollers 120 and 122. Rollers 320 and 322 are mounted on shafts 324 and 326, respectively, which are carried by a bracket 328. The rollers are driven in opposite directions as indicated by the arrows in FIG. 6 by a suitable drive mechanism (not shown). Bracket 328 is movable about a pivot 330 by a solenoid 332 or by a return spring 334. Thus when the solenoid is energized bracket 328 is moved to the position illustrated to bring rollers 320 into engagement with the platen for driving a document sheet from right to left as viewed in FIG. 6. When the solenoid is de-energized, spring 334 swings the bracket about pivot 330 to bring rollers 322 into engagement with the platen, thereby to drive the document sheet in a direction from left to right across the platen. This reversible sheet drive will result in less wear on the platen rollers 320, 322 then does the mechanism shown in FIG. 5 not only because each roller 320, 322 is in contact with the platen or document sheet for a shorter period of time in a cycle of operation, but also because it has been found that rollers driven in one direction only have a greater life.

The logic and control unit 12 coordinates operation of the recirculating feeder 84 and document positioner 86 so that the document sheets are cycled at the appropriate time and in sequence with the various work stations of the copier apparatus. This requires that the LCU receive data from various sensors in the recirculating feeder and document positioner and that it be capable of sending back signals to various clutches, relays, motors and the like to control the operation of such apparatus. Thus in FIG. 1 a bundle of lines for furnishing information to the LCU from the recirculating feeder and document positioner, respectively, are designated 350 and 352, and a bundle of lines for furnishing control signals from the LCU back to the recirculating feeder and document positioner are designated 354 and 356, respectively. Also, the LCU receives operator input by means of a keyboard 358. For example, the operator will use the keyboard to indicate the mode of operation (simplex, duplex or document positioner) and the number of copies to be made from the document positioner or the number of sets of copies to be made from the recirculating feeder.

Figure 7:
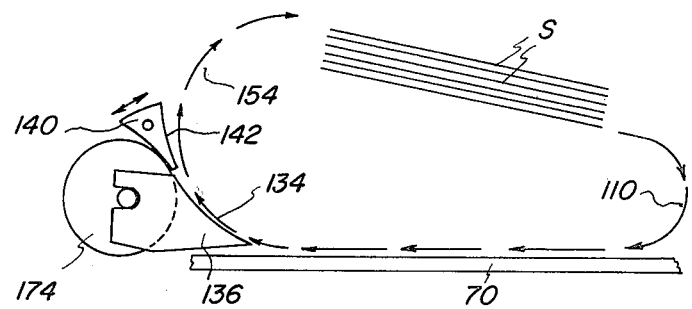
FIGS. 7-9 diagrammatically illustrate various modes of operation of the sheet feeding apparatus.
Figure 8:
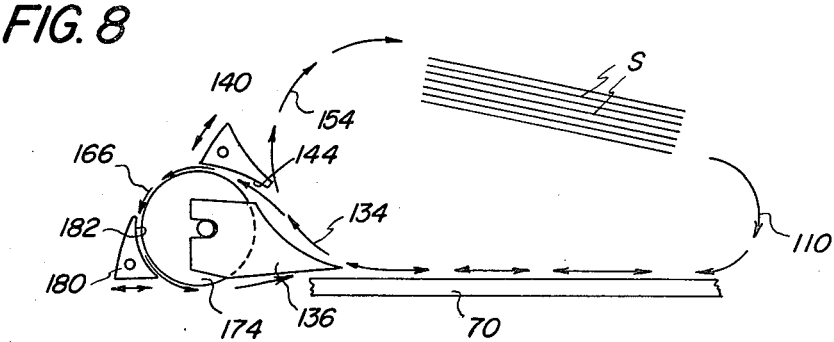
Figure 9:
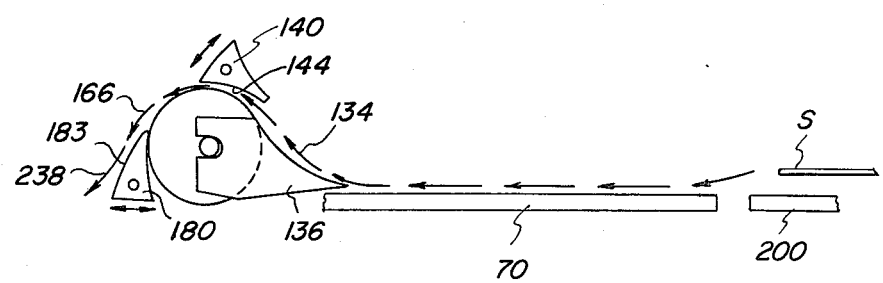

FIGS. 7-9 diagrammatically illustrate three different modes of operation of the sheet feeding apparatus of the invention. FIG. 7 shows the simplex mode of operation wherein only one side of each document sheet is to be copied. In such instance the document sheets are positioned in the tray 92 with the information to be copied facing upwardly, with the document sheets in their normal order, and with the topmost sheet being the first sheet of the document. In response to a signal from the LCU, the lowermost document sheet is withdrawn from the stack by means of the oscillating vacuum device 102 and fed through the guide path 110 onto the platen 70. The sheet is registered, the lamps 72 are flashed to expose the document sheet and a copy is made by copier 10 in the manner previously explained. The document sheet is then driven from the platen in the same direction, that is, from right to left, through the sheet paths 134 and 154 back onto the top of the stack of document sheets in the tray 92. At this time the sheet diverter 140 is urged clockwise as illustrated in FIG. 7 so that the sheets are deflected by the diverter back to the tray without being inverted and returned to the platen a second time. This cycle continues until the required number of sets of copies has been made, as determined by set counters 100 and the LCU.

FIG. 8 illustrates the duplex mode of operation, i.e., when the document sheets S contain information on both faces thereof which is to be copied. In this case, as in the simplex mode, the document sheets are positioned in the tray 92 stacked in their normal order and with the upper side of the topmost sheet containing the first page of information of the document. The lower side of the bottommost sheet may be blank or may contain information to be copied. When the machine is energized the oscillating vacuum device 102 withdraws the bottommost sheet from the stack, feeds the sheet across platen 70 without stopping the sheet and around the sheet inverting path 166 and back onto the platen 70. At this time the diverter 140 is moved counterclockwise so that the diverter deflects the document sheet into the path 166. Similarly, sheet diverter 180 is urged counterclockwise so that it directs the document sheets back onto the platen 70. As the sheet travels around the inverting path 166 the drive rollers 120, 122 are reversed (or rollers 322 are moved into the driving position) so that the document is then driven from left to right in a second direction across the platen 70. After the trailing edge of the document sheet clears the registration gate 130, drive rollers 121, 122 again are reversed (or rollers 320 are moved to the driving position) to drive the document sheet up against the registration gate and hold the document sheet in that position until the lamps 72 are flashed to copy the lower side of the bottommost sheet of the stack. Then the gate is lifted, the document sheet is again driven through the sheet inverting paths 134 and 166 back onto the platen and again registered against the gate, this time with the upper side of the bottommost document sheet facing the platen for exposure when the lamps 72 are flashed. After the second exposure the sheet diverter 140 is swung clockwise and the drive rollers 120 and 122 (or rollers 320) drive the document sheet through the sheet path 134 and into the sheet inverting path 154 so that it is returned to the top of the stack of document sheets in the tray 92. This sequence is repeated until all of the document sheets have been copied one or more times as determined by the set counter 100 and the input to the LCU of the machine. Because the two sides of the document sheets are copied sequentially, there is no need to provide in the copier/duplicator a tray for accumulating a stack of copy sheets copied on one side only, and then feed that stack through the transfer station a second time, as is required with some prior art apparatus.

When document sheets are to be copied by means of the document positioner 86, the document sheet is fed across tray 200, passes through the sheet registration device and then onto the platen 70 where it is registered by the gate 130. Then one or more copies of the document sheets are made, the gate is raised, and the drive rollers 120 and 122 drive the document sheet from the platen and partially through the path 134. At this time the sheet diverter 140 is moved counterclockwise and the sheet diverter 180 is moved clockwise so that the document sheet is directed along the path 166 and then the non-recirculating sheet path 238 to deliver the sheet to tray 242. While the operation of the document positioner has been specifically described in connection with the copying of simplex original documents, it will be apparent that duplex documents can be copied by moving diverter 180 to invert the document and return it to the platen as explained in connection with the operation of the recirculating feeder.

The document sheet feeding apparatus of the present invention offers a number of advantages. First of all, the combination of a recirculating feeder and a document positioner permits individual document sheets to be fed through the document positioner for copying one or more times and removed from the platen in a non-recirculating path. It is not necessary to lift the recirculating feeder structure from the platen for manually positioning individual document sheets for copying as is required by some prior art devices, (such as disclosed in the beforementioned U.S. Pat. No. Re. 27,976 and the copending U.S. Pat. Application Ser. No. 647,683). In addition, some parts of the apparatus are used in both the recirculating modes and the document positioner mode, thereby reducing the overall expense of manufacture without sacrificing the effectiveness of either function. For example, the rollers 120 and 122 (or 320 and 322) used for driving sheets across the platen are utilized for all three modes of operation. Also, the structure forming the sheet paths 134 and 166 are utilized both for duplex copying and for copying by means of the document positioner. In addition, a recirculating feeder for duplex document sheets having the turn-around mechanism located at the end of the platen opposite from the oscillating vacuum feeder device 102 is advantageous since the document sheet initially stripped from the stack of sheets S can be fed without stopping across the platen and through the turn-around device and back onto the platen, thereby minimizing the start-stop operations required for transport of the document sheets. Also, the turn-around structure is easily available for adjustment and repair due to its location at the end of the platen opposite from the document positioner and oscillating vacuum feeder device. Because of the substantially straight path for document sheets through the document positioner, sheets will pass through the positioner safely even though they are prepared by pasting portions of the document onto a backing sheet. As mentioned previously, such sheets may not feed reliably through a recirculating feeder.

While the invention has been described in detail with particular reference to preferred embodiments thereof, it will be understood that variations and modifications can be effected within the spirit and scope of the invention as described hereinabove and as defined in the appended claims.

We claim:

1. Sheet feeding apparatus for use with a copying machine, the apparatus being adapted to feed one or more document sheets from document supporting means to an exposure station spaced therefore, for copying of information on a first side and a second side of a document sheet or for copying only information on the first side of the sheet, the feeding apparatus comprising:

means defining a recirculating sheet path extending from the supporting means to the exposure station and then back to the supporting means and inverting a document sheet once as it travels along a first portion of the path extending from the supporting means to the station, thereby to present the first side of the document sheet for copying, and inverting the document sheet a second time as it travels along a second portion of the path extending from the station back to the supporting means;

means defining a sheet inverting path, the inverting path intercepting the second portion of the recirculating sheet path, the inverting path forming a loop leading back to the station so that a document sheet is inverted once as it travels along the inverting path;

means for diverting the document sheet from the recirculating path to the inverting path when the sheet is to be inverted and returned to the station;

drive means for advancing document sheets along the recirculating sheet path and the inverting path; and control means for operating said diverter means to effect presentation of one side or both sides of document sheets for copying.

2. Sheet feeding apparatus as set forth in claim 1 further comprising:

means defining a substantially straight non-recirculating sheet path leading to the station and away from the station, said non-recirculating sheet path having portions that are coextensive with the recirculating sheet path and the inverting sheet path and having entrance and exit portions that are separate from the recirculating sheet path and the inverting sheet path, and a diverter for deflecting a document sheet from said inverting sheet path into the exit portion of the non-recirculating sheet path.

3. Sheet feeding apparatus as set forth in claim 2 wherein said drive means comprises a plurality of drive rollers located at the exposure station and engageable with document sheets in the recirculating sheet path and the non-recirculating sheet path for advancing sheets in a first direction across the station and into the inverting sheet path and for advancing sheets received from the inverting sheet path in the opposite direction.

4. Sheet feeding apparatus as set forth in claim 3 further comprising a plurality of drive shafts, said rollers being mounted on said shafts, and means for reversing the direction of rotation of said shafts, thereby to control the direction of movement of the sheets across the station.

5. Sheet feeding apparatus as set forth in claim 3 wherein said drive rollers comprise a first set of rollers and a second set of rollers, means for driving said sets of rollers in opposite directions, and means for moving said first set of rollers or said second set of rollers into a position for advancing sheets across the station.

6. A combination recirculating sheet feeder and document positioner for feeding document sheets from supporting means to an exposure station spaced from the supported means, the feeder and positioner comprising:— means defining a recirculating sheet path having a first portion extending from said supporting means to the station and having a second portion extending from the station back to the supporting means;

means defining a non-recirculating sheet path extending to the station and away from the station and being at least partially coextensive with said recirculating sheet path in the area of the station, said non-recirculating sheet path having entrance and exit portions that diverge from the recirculating sheet path; and drive means for advancing document sheets along the respective sheet paths.

7. The invention as set forth in claim 6 further comprising means defining a sheet inverting path intercepting the recirculating sheet path and forming a loop leading back to the station and inverting a document sheet once as it is advanced along the sheet inverting path, drive means for advancing a document sheet along the sheet inverting path, and a sheet diverter movable between first and second positions and located with respect to said recirculating sheet path and said sheet inverting path to deflect a document sheet being advanced along the second portion of the recirculating sheet path into the sheet inverting path when the diverter is in its first position, thereby to invert and return the sheet to the station for copying.

8. Sheet feeding apparatus for use with a copier having a platen at which one or more document sheets are position for copying of information on a first side and a second side of a sheet or for copying only information on the first side of the sheet, the apparatus comprising:

a tray spaced from the platen and adapted to receive a stack of document sheets with the sheets arranged in sequential order with the first side of all sheets facing upwardly and with the first side of the first sheet being on top of the stack;

means for (1) removing the bottom sheet from the stack along a first sheet path, (2) inverting said sheet so that the first side thereof faces downwardly and (3) feeding said sheet onto the platen in a first direction;

means for (1) feeding a sheet from the platen in said first direction along a second sheet path, (2) inverting the sheet and (3) feeding the sheet back onto the platen in a second direction opposite to the first direction;

means for (1) feeding a sheet from the platen in said first direction along a third sheet path, (2) inverting the sheet and (3) returning the sheet to the tray on top of any other document sheets in the tray; and control means effective (1) to cause a document sheet to be fed along the second sheet path twice when information on both the first side and second side of the sheet is to be copied and (2) to cause the sheet to bypass the second sheet path and be fed along the third sheet path when information on only the first side of the sheet is to be copied.

9. Sheet feeding apparatus as set forth in claim 8 further comprising a second tray on which a document sheet to be copied is positioned with the side of the sheet to be copied facing downwardly, a third tray for receiving a document sheet after it has been copied, and means defining a fourth sheet path from the second tray to the platen and then to the third tray.

10. In a recirculating feeder including means for feeding seriatim the sheets of a document from document support means along a recirculation path to the platen of a copier for copying and then back to the support means a plurality of times to obtain a plurality of sets of collated copies from the copier, means for selectively presenting one side only or both sides of the document sheets in sequence to the platen for copying, comprising:

means defining a sheet inverting path which intercepts said recirculation path for inverting a sheet moving in the recirculation path and for moving the inverted sheet onto the platen;

means associated with said recirculation path and said inverting path for diverting a sheet moving along said recirculation path into said inverting path; and means for actuating the diverting means when a document sheet is to be inverted relative to the platen, whereby one or both sides of the document sheet are positioned for copying by the copier prior to returning to the support means.

11. Apparatus for feeding document sheets seriatim from support means to a copier platen for copying information from either side or both sides of the sheets, the apparatus comprising:

means defining a recirculating sheet path including a first portion extending from the support means to a location superposed on the platen and a second portion extending from said location back to the support means, which means inverts sheets the same number of times while traversing each portion;

means defining a sheet inverting path which intercepts one of said portions and extends to said locations, which means inverts sheets an odd number of times while traversing said inverting path;

means for moving sheets in said recirculating and inverting paths;

means for selectively diverting a sheet from said one of said portions into said sheet inverting path when information on both sides of such sheet is to be copied; and means for controlling said diverting means to determine the path in which sheets move so that either one side or both sides of said sheets can be copied.

* * * * *